(12) United States Patent
Lush

(10) Patent No.: US 7,171,921 B1
(45) Date of Patent: *Feb. 6, 2007

(54) SQUIRREL REPELLING HANGER FOR A BIRD FEEDER OR THE LIKE

(76) Inventor: Raymon W. Lush, 410 Main St., Bloomfield, NE (US) 68718

( * ) Notice: Subject to any disclaimer, the term of this patent is extended or adjusted under 35 U.S.C. 154(b) by 0 days.

This patent is subject to a terminal disclaimer.

(21) Appl. No.: 10/827,034

(22) Filed: Apr. 19, 2004

(51) Int. Cl.
*A01K 39/01* (2006.01)

(52) U.S. Cl. ..................................... 119/57.9

(58) Field of Classification Search ............... 119/52.3, 119/57.9, 429
See application file for complete search history.

(56) References Cited

U.S. PATENT DOCUMENTS

| | | | |
|---|---|---|---|
| 4,541,362 A | 9/1985 | Dehls | 119/52.3 |
| 5,048,461 A | 9/1991 | Wessner | 119/52.3 |
| 5,105,765 A | 4/1992 | Loken | 119/57.9 |
| 5,297,503 A | 3/1994 | Hibbard | 119/57.9 |
| 5,392,732 A | 2/1995 | Fry | 119/57.9 |
| 5,471,951 A | 12/1995 | Collins | 119/57.9 |
| 5,690,056 A | 11/1997 | Korb | 119/52.3 |
| 5,720,238 A | 2/1998 | Drakos | 119/57.9 |
| 6,119,627 A | 9/2000 | Banyas et al. | 119/57.9 |
| 6,408,789 B1 * | 6/2002 | Hsiao | 119/57.9 |
| 6,604,487 B2 | 8/2003 | Lush | 119/57.9 |

* cited by examiner

*Primary Examiner*—Robert P. Swiatek
(74) *Attorney, Agent, or Firm*—Thomte, Mazour & Niebergall

(57) ABSTRACT

A squirrel repelling hanger for a bird feeder which utilizes a load cell which senses the weight of a squirrel thereon and which energizes a motor to rotate a repelling disk located at the upper end of the hanger without rotating the bird feeder which is supported from the lower end of the hanger.

3 Claims, 2 Drawing Sheets

SQUIRREL REPELLING HANGER FOR A BIRD FEEDER OR THE LIKE

BACKGROUND OF THE INVENTION

1. Field of the Invention

This invention relates to a squirrel repelling hanger for a bird feeder or the like and more particularly to a rodent repelling hanger for a bird feeder which prevents squirrels from feeding from the bird feeder.

2. Description of the Related Art

Several types of bird feeders have been designed for preventing unwanted animals such as squirrels from eating the bird food in the feeder. Little prior art exists on rodent repelling hangers where various types of plants, feeders and bird shelters may be hung therefrom. One type of bird feeder has weight-sensitive tiltable perches thereon so when a squirrel or large bird lands on the perch, the perch moves and dislodges the animal. This type of bird feeder is shown in Loken U.S. Pat. No. 5,105,765; Wessner U.S. Pat. No. 5,048,461; and Dehls U.S. Pat. No. 4,541,362.

Another type of device uses a shocking system to send an electric impulse into the unwanted animal when that animal attempts to eat from the feeder. This type of device is shown in Fry U.S. Pat. No. 5,392,732 and Collins U.S. Pat. No. 5,471,951.

Still another type of repelling device uses weight-sensitive devices to discourage the unwanted animal from feeding from the feeder. This device shuts off the food supply when a heavy animal or bird lands upon the perch. This type of device is taught in Drakos U.S. Pat. No. 5,720,238.

Yet another type of repelling device to which the present invention pertains senses the excessive weight of a squirrel or unwanted bird and removes the unwanted animal at a predetermined point in time. This type of device is taught in Hibbard U.S. Pat. No. 5,297,503; Korb U.S. Pat. No. 5,690,056; and Banyas U.S. Pat. No. 6,119,627.

Applicant previously invented an improved squirrel repelling device and received U.S. Pat. No. 6,604,487 for the same. Although the device in U.S. Pat. No. 6,604,487 represents an improvement in the art, the instant invention is believed to represent a further improvement in the art due to the ease of manufacture, simplicity and reliability.

SUMMARY OF THE INVENTION

A squirrel repelling hanger for a bird feeder or the like for repelling unwanted animals such as squirrels is disclosed. The hanger assembly of the present invention is attached to a tree, deck or the like. The hanger assembly comprises an elongated rod, a repelling disk and a motor enclosure having a gearing mechanism which will rotate the repelling disk at such a time as an unwanted animal alights upon the disk.

This invention has a load cell operatively mechanically connected to the repelling disk which is operatively electrically connected to the motor through an electrical circuit so that if the unwanted animal alights on the disk, the motor and gearing mechanism will rotate the disk, with the centrifugal force generated by the rotation of the disk being sufficient to throw the animal from the disk, much to the amusement of all watching.

It is therefore a principal object of the invention to provide a repelling hanger assembly so feeders, plants, etc., may be hung without being accessible to unwanted animals such as squirrels or the like.

Yet another object of the invention is to provide a squirrel repelling bird feeder.

Still another object of this invention is to provide an inexpensive practical means of protecting bird feeders from unwanted animals such as squirrels.

Yet another object of this invention is to provide a rodent repelling bird feeder that is functional in various weather conditions.

These and other objects will be obvious to those skilled in the art.

DESCRIPTION OF THE PREFERRED EMBODIMENT

Figure 1:
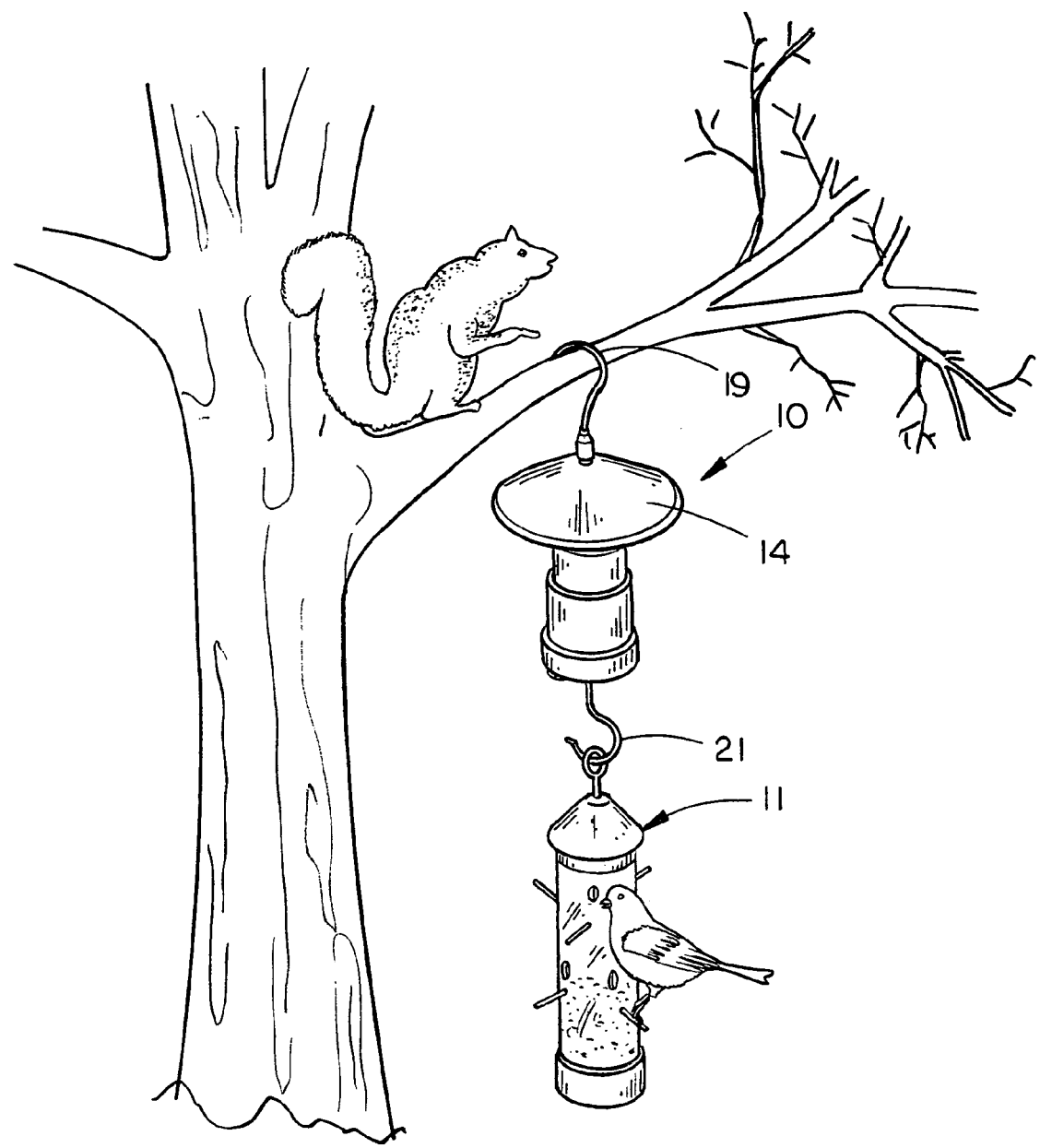
FIG. 1 is a perspective view of the present invention.
Figure 2:
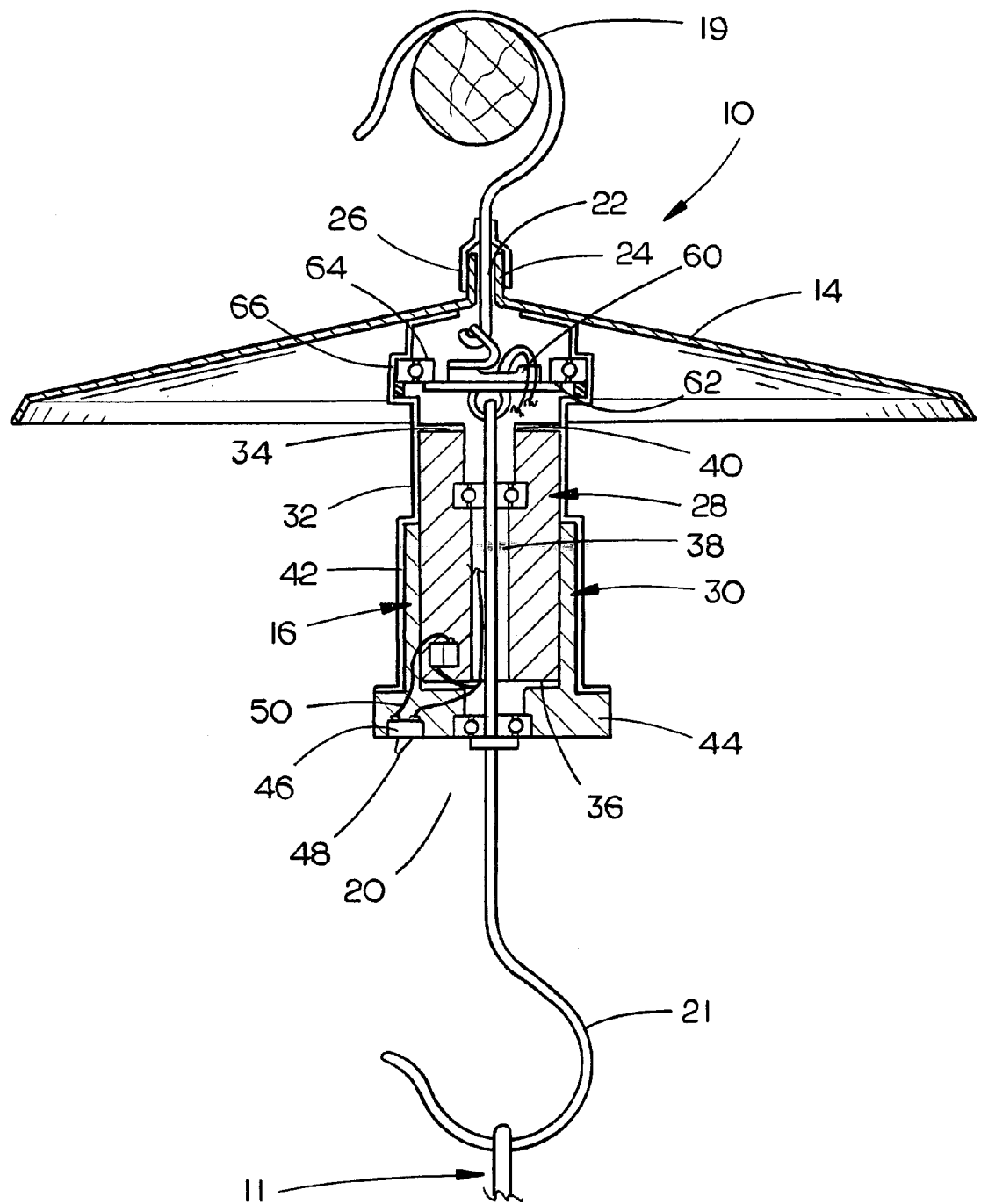
FIG. 2 is a partial sectional view of the hanger of FIG. 1.

The squirrel repelling hanger assembly for a bird feeder of this invention is referred to generally by the reference numeral 10 for supporting the bird feeder 11 having food therein. The hanger assembly 10 generally comprises an upper support 19, a repelling disk 14 and a motor enclosure 16. The hook means of support 19 could be replaced by a strap, or any other supporting means known in the art. Similarly, lower end 20 has a supporting means in the form of a hook 21 for supporting the bird feeder 11.

The disk 14 is positioned above the motor enclosure 16 and has an opening 22 located in the center thereof which allows the hook 19 to pass therethrough without being in contact therewith. The disk 14 slopes downwardly from the opening 22 to its periphery to allow water to run off the disk and away from the opening 22. The disk 14 may be solid or have air passageways formed therein to minimize the bird feeder's movement from the wind. Preferably, the disk 14 is transparent. A tube 24 projects upwardly from opening 22 and embraces the hook 19. Hook 19 has a weather guard 26 extending outwardly and downwardly over the tube 24, thereby protecting the opening 22 from the weather.

The main operative portion of the invention resides in the motor enclosure 16. The motor enclosure 16 comprises a motor housing 28, a motor sleeve 30 and a protective cover 32. The motor housing 28 has an upper end 34, a lower end 36 and an elongated bore 38 extending from upper end 34 to the lower end 36 of the motor housing 28. The motor housing 28 is operably connected to a hollow drive shaft 40 which is positioned around hook 19 and which is coupled to disk 14 for rotating the same. The motor housing 28 is telescopically engaged in the motor sleeve 30, as seen in the drawings, and which comprises a side wall 42 and a base 44. The protective cover 32, which allows reciprocation between the motor housing 28 and the motor sleeve 30, is positioned over the housing 28 and sleeve 30 for protection from the weather. Within the motor housing 28 is a battery compartment for housing one or more suitable dry cell batteries which will drive a suitable D.C. electric motor turning a gear reduction unit. In another embodiment, the batteries may also be housed in the motor sleeve to maximize the space available in the motor housing. Furthermore, the motor need not be electrically driven. The motor may be driven by a wind-up spring driven motor or the like. The motor and gear reduction unit are not specifically detailed in the drawing, inasmuch as these types of units are quite common in the electrical and mechanical arts and it is believed that the same need not be specifically described. The motor and gear reduction units would be housed together proximal the upper end 34 of the motor housing 28, all of which is in the same motor enclosure 16.

At the bottom of the motor sleeve 30, there is a user-activated control on-off switch 46 comprising a contact switch button 48 which enables the user to turn the performance features of the hanger 10 on and off at will.

The hook or support 19 is connected at its lower end to a load cell 60 of conventional design. The load cell may be a S-load cell, a beam load cell, or any other type of load cell available on the market. The load cell 60 is conventionally connected to a conventional circuit board preferably including a microprocessor in conventional fashion. Load cell 60 is supported upon a support 62 which has the upper end of the hook 21 secured thereto. Support 62 is secured to the inner race 64 of a bearing 66 so that disk 14 may be rotated with respect to load cell 60 and hook 21.

The load cell 60 is calibrated such that when a filled bird feeder 11 is supported on the lower support 21, the circuit will be open. If a predetermined weight is placed on the bird feeder 11, such as a squirrel or large bird, the load cell will activate the circuit board and the motor.

In operation of the present invention, when a squirrel or the like alights upon the disk 14, the weight of the squirrel thereon will cause the disk 14 which will cause the disk 14 to be moved downwardly with respect to the connection of the hook 19 and the load cell 60 which will cause the load cell 60 to activate the motor so that disk 14 is rotated, without rotating the bird feeder 11, to cause the squirrel to be dislodged and propelled from the disk 14. Once the squirrel has been dislodged and propelled from the disk 14, the weight is reduced thereupon which will cause the load cell to deactivate the motor to half the rotation of the disk.

Thus it can be seen that the invention accomplishes at least all of its stated objectives.

I claim:

1. A squirrel repelling hanger assembly for a bird feeder, comprising:

a first support having upper and lower ends;

said lower end of said first support being mechanically connected to a load cell which is electrically connected to an electrical circuit;

a second support operatively connected to said load cell for supporting a bird feeder;

a repelling disk rotatably mounted above said load cell and being rotatable with respect thereto and with respect to said first support;

a motor electrically connected to the electrical circuit and mechanically connected to said repelling disk which rotates said disk without rotating said second support and bird feeder when the weight of an undesirable animal upon said disk causes said load cell to activate said motor through the electrical circuit.

2. The structure of claim 1 wherein said disk has openings to allow air to pass therethrough.

3. The structure of claim 1 wherein said first and second supports means are hooks.

* * * * *